(12) United States Patent
Lu et al.

(10) Patent No.: US 7,554,559 B2
(45) Date of Patent: Jun. 30, 2009

(54) EDGE DIRECTED DE-INTERLACING

(75) Inventors: Tiehan Lu, Chandler, AZ (US); Jorge E. Caviedes, Mesa, AZ (US); Walid Ali, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 11/270,429

(22) Filed: Nov. 8, 2005

(65) Prior Publication Data

US 2007/0103485 A1    May 10, 2007

(51) Int. Cl.
*G09G 5/00* (2006.01)
(52) U.S. Cl. .................... 345/606; 382/266; 382/300
(58) Field of Classification Search ............... 345/606, 345/610, 611
See application file for complete search history.

(56) References Cited

U.S. PATENT DOCUMENTS

| | | | | |
|---|---|---|---|---|
| 5,019,903 | A | * | 5/1991 | Dougall et al. ............... 348/448 |
| 5,602,654 | A | * | 2/1997 | Patti et al. ................... 358/461 |
| 5,832,143 | A | * | 11/1998 | Suga et al. ................... 382/300 |
| 6,421,090 | B1 | * | 7/2002 | Jiang et al. ................... 348/452 |
| 7,126,643 | B2 | * | 10/2006 | Song et al. ................... 348/448 |
| 7,154,556 | B1 | | 12/2006 | Wang et al. |
| 2001/0008425 | A1 | | 7/2001 | Shin et al. |
| 2004/0114833 | A1 | * | 6/2004 | Jiang ........................... 382/300 |
| 2005/0122426 | A1 | | 6/2005 | Winger et al. |
| 2005/0129306 | A1 | | 6/2005 | Wang et al. |
| 2005/0134602 | A1 | * | 6/2005 | Winger et al. ............... 345/606 |
| 2006/0215058 | A1 | * | 9/2006 | Lu et al. ...................... 348/452 |
| 2006/0285010 | A1 | | 12/2006 | Wang et al. |

FOREIGN PATENT DOCUMENTS

| | | |
|---|---|---|
| CN | 1168052 | 12/1997 |
| CN | 1421098 | 5/2003 |
| CN | 1512774 | 7/2004 |
| EP | 0 697 788 | 2/1996 |

OTHER PUBLICATIONS

Pending U.S. Appl. No. 11/022,625, filed Dec. 27, 2004; Inventor: Caviedes.

(Continued)

*Primary Examiner*—Kee M Tung
*Assistant Examiner*—Jwalant Amin
(74) *Attorney, Agent, or Firm*—Trop, Pruner & Hu, P.C.

(57) ABSTRACT

One implementation of a method for edge directed video de-interlacing in accordance with the disclosed invention includes obtaining at least a portion of a field of input video data including at least portions of four consecutive rows of field pixels including first, second, third, and fourth rows of field pixels. The method further includes selecting an orientation over which to de-interlace the input video data based, at least in part, on a measure of the deviation in pixel values among the four consecutive rows of field pixels and a fifth row of pixels located between the second and third rows of field pixels, the fifth row of pixels including previously interpolated pixel values and pixel values obtained by line averaging between pixel values in the second and third rows of field pixels. The method further includes interpolating along the selected orientation to determine a value for a pixel to be interpolated.

15 Claims, 5 Drawing Sheets

OTHER PUBLICATIONS

Pending U.S. Appl. No. 11/091,853, filed Mar. 28, 2005, Inventor: Tiehan Lu et al.

Chinese Patent Office, Office Action issued in corresponding Chinese Application No. 200610064294.X, 19 pages, Dec. 5, 2008.

* cited by examiner

EDGE DIRECTED DE-INTERLACING

BACKGROUND

De-interlacing capability is a common feature of today's televisions, Digital Video Disc (DVD) players and set-top boxes (STBs). Video format conversion such as converting standard definition (SD) video content into high definition (HD) content requires de-interlacing of the interlaced content. In addition, de-interlacing functionality is needed to convert interlaced video content into a form suitable for modern progressive scan displays.

De-interlacing techniques can be classified as intra-field, inter-field, motion adaptive or motion compensation. Intra-field de-interlacing is the process of interpolating missing pixel values from an existing field of interlaced video pixel values to generate a full frame image. Intra-field de-interlacing is an attractive technique because it maximizes de-interlacing speed while minimizing computational complexity. However, conventional intra-field de-interlacing techniques may cause visible artifacts when de-interlacing video content that includes shallow angle edges.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description specific details may be set forth such as particular structures, architectures, interfaces, techniques, etc. in order to provide a thorough understanding of the various aspects of the claimed invention. However, such details are provided for purposes of explanation and should not be viewed as limiting with respect to the claimed invention. With benefit of the present disclosure it will be apparent to those skilled in the art that the various aspects of the invention claimed may be practiced in other examples that depart from these specific details. Moreover, in certain instances, descriptions of well known devices, circuits, and methods are omitted so as not to obscure the description of the present invention with unnecessary detail.

Figure 1:
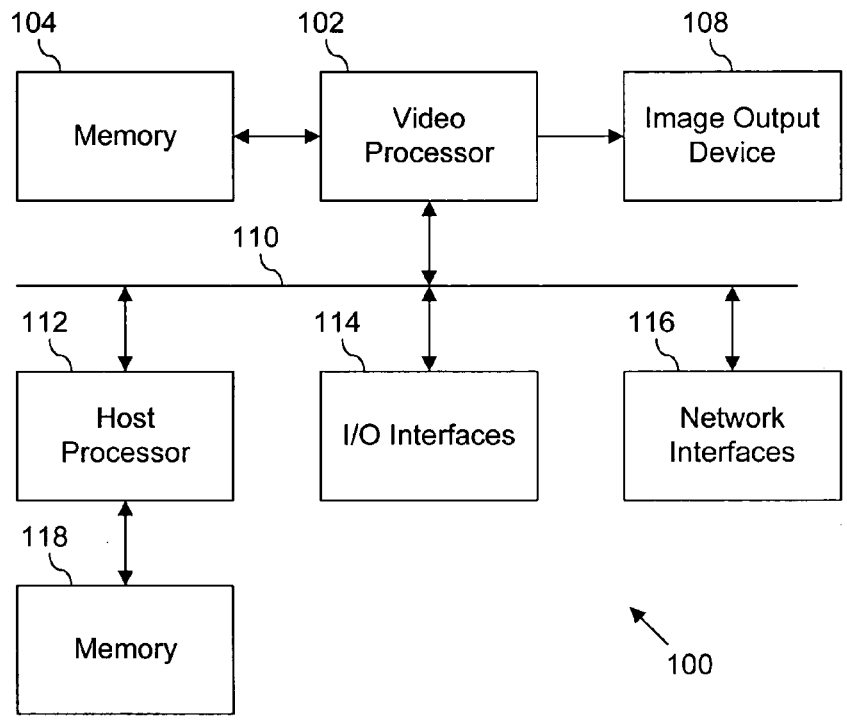
FIG. 1 illustrates an example video processing system.

FIG. 1 illustrates an example system 100 according to one implementation of the invention. System 100 may include one or more video processors 102, memory 104, and one or more image data output devices 108. In addition, in one implementation, processor 102 may communicate over a shared bus or other communications pathway 110 with a host processor 112, one or more input/output (I/O) interfaces 114 (e.g., universal synchronous bus (USB) interfaces, parallel ports, serial ports, telephone ports, and/or other I/O interfaces), and/or one or more network interfaces 116 (e.g., wired and/or wireless local area network (LAN) and/or wide area network (WAN) and/or personal area network (PAN), and/or other wired and/or wireless network interfaces). Host processor 112 may also communicate with one or more memory devices 118.

System 100 may assume a variety of physical implementations suitable for edge directed de-interlacing of video data. For example, image output device 108 may be implemented in a single device such as a digital television; while video processor 102, memory 104, host processor 112, interfaces 114/116, and memory 118 may be implemented in a device such as a set-top box (STB) coupled to output device 108 through communications pathway 110 (e.g., a digital transmission cable, a wireless network, etc.). Alternatively, all or most of the components of system 100 may be implemented in a single device such as a personal computer (PC), a networked PC, a server computing system, a handheld computing platform (e.g., a personal digital assistant (PDA)), cell phone, etc. Moreover, while components of system 100 may be implemented within a single device, such as a system-on-a-chip (SOC) integrated circuit (IC), components of system 100 may also be distributed across multiple ICs or devices.

Video processor 102 may constitute any video processing logic including one or more devices and/or logic modules capable of performing one or more video processing functions. For example, although the invention is not limited in this regard, processor 102 may comprise a collection of coupled video processing logic elements, each processing element capable of undertaking video processing functions. In one implementation, video processor 102 may receive interlaced video data (e.g., in the form of video field data comprising rows of individual pixel values) from memory 104 and/or from processor 112 or other video data sources coupled to system 100 through interfaces 114/116. In one implementation, video processor 102 may be used for implementing methods for edge directed de-interlacing of video data in accordance with the invention. Video processor 102 may output resulting de-interlaced video data to memory 104 and/or image output device 108.

Memory 104 and/or memory 118 may be any device and/or mechanism capable of storing and/or holding video data, color pixel data and/or component values, to name a few examples. For example, although the invention is not limited in this regard, memory 104 may be volatile memory such as static random access memory (SRAM) or dynamic random access memory (DRAM). For example, although the invention is not limited in this regard, memory 118 may be non-volatile memory such as flash memory.

Image data output device(s) 108 may include any of a number of mechanisms and/or device(s) that consume and/or display video data. For example, although the invention is not limited in this regard, image output device 108 may comprise a television display such as a cathode ray tube (CRT), liquid crystal display (LCD), plasma display panel (PDP) etc. Those of skill in the art will recognize that certain image processing components (e.g., display processor) that would be necessary to implement the displaying of de-interlaced video data by device 108 but that are not particularly germane to the claimed invention have been omitted from system 100 in the interest of clarity.

Host processor 112 may be, in various implementations, a special purpose or a general purpose processor. Further, host processor 112 may comprise a single device (e.g., a microprocessor or ASIC) or multiple devices. In one implementation, host processor 112 may be capable of performing any of a number of tasks that support methods for edge directed de-interlacing of video data. These tasks may include, for example, although the invention is not limited in this regard, downloading microcode to processor 102, initializing and/or configuring registers within processor 102, interrupt servicing, and providing a bus interface for uploading and/or downloading video data. In alternate implementations, some or all of these functions may be performed by processor 102.

Figure 2:
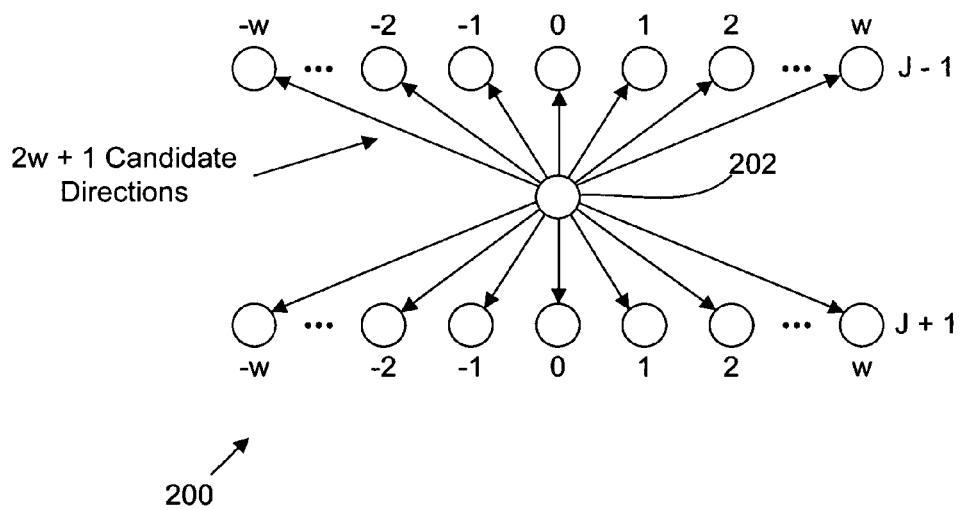
FIG. 2 illustrates a representative video pixel labeling scheme.

FIG. 2 illustrates a representative labeling scheme 200 that may be used to describe implementations of edge directed de-interlacing in accordance with implementations of the invention. When de-interlacing input video data in accordance with an implementation of the invention, an output pixel value 202 to be generated by interpolation to form part of a new line of video data J may be interpolated using the average of one or more pairs of pixels of existing lines of video data J−1 and J+1 from a field of input interlaced video data. Thus, a value for pixel 202 may be generated by interpolation between any one of the pixel pairs (−W, W), . . . , (−2, 2), (−1, 1), (0, 0), (1, −1), (2, −2), . . . , (W, −W); where W may be described as a horizontal distance over which candidate directions and/or de-interlacing orientations may be assessed. For example, if a horizontal distance W=3 is selected then a total of 2W+1=7 candidate directions may be evaluated where those directions are delineated by the pixel pairs (−3, 3), (−2, 2), (−1, 1), (0, 0), (1, −1), (2,−2), and (3, −3). In one implementation of the invention, a value of W=5 may provide satisfactory results as will be explained in more detail below. However, the invention is not limited in this regard and other values of W may be implemented in accordance with the invention.

In accordance with an implementation of the invention, each one of the 2W+1 candidate directions and/or de-interlacing orientations may be assigned a score based on an assessment of neighboring pixel values associated with the pixel pairs delineating those directions as will be described in greater detail below. The pixel pair delineating the candidate direction having the best score of the 2W+1 candidate directions may then be selected as the pair to be interpolated to generate a value for the output pixel 202.

Figure 3:
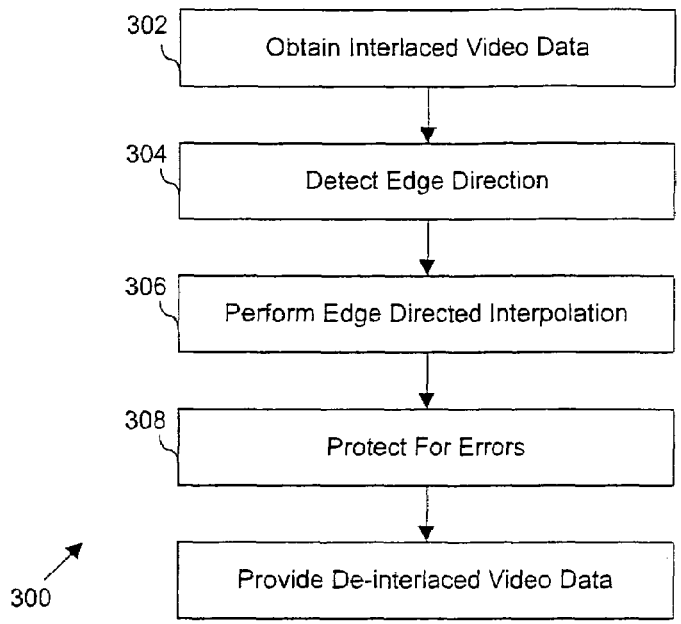
FIG. 3 is a flow chart illustrating an example process for edge directed de-interlacing.

FIG. 3 is a flow diagram illustrating a process 300 for edge directed de-interlacing in accordance with an implementation of the claimed invention. While, for ease of explanation, process 300, and associated processes, may be described with regard to system 100 of FIG. 1, the claimed invention is not limited in this regard and other processes or schemes supported and/or performed by appropriate devices and/or combinations of devices in accordance with the claimed invention are possible.

Process 300 may begin with obtaining of interlaced video data [act 302]. In one implementation, processor 102 may obtain a portion of a field of interlaced video data stored in memory 104. For example, processor 102 may obtain input video data in the form of a portion of an odd field of a single frame of luma pixels having 8-bit intensity values. The invention is not limited in this regard however and processor 102 may obtain input video data in act 302 from many sources and in many forms. For example, processor 102 may obtain input video data from other devices coupled to pathway 110 or, for that matter, from a source external to system 100 via interfaces 112 and/or 116.

Figure 4:
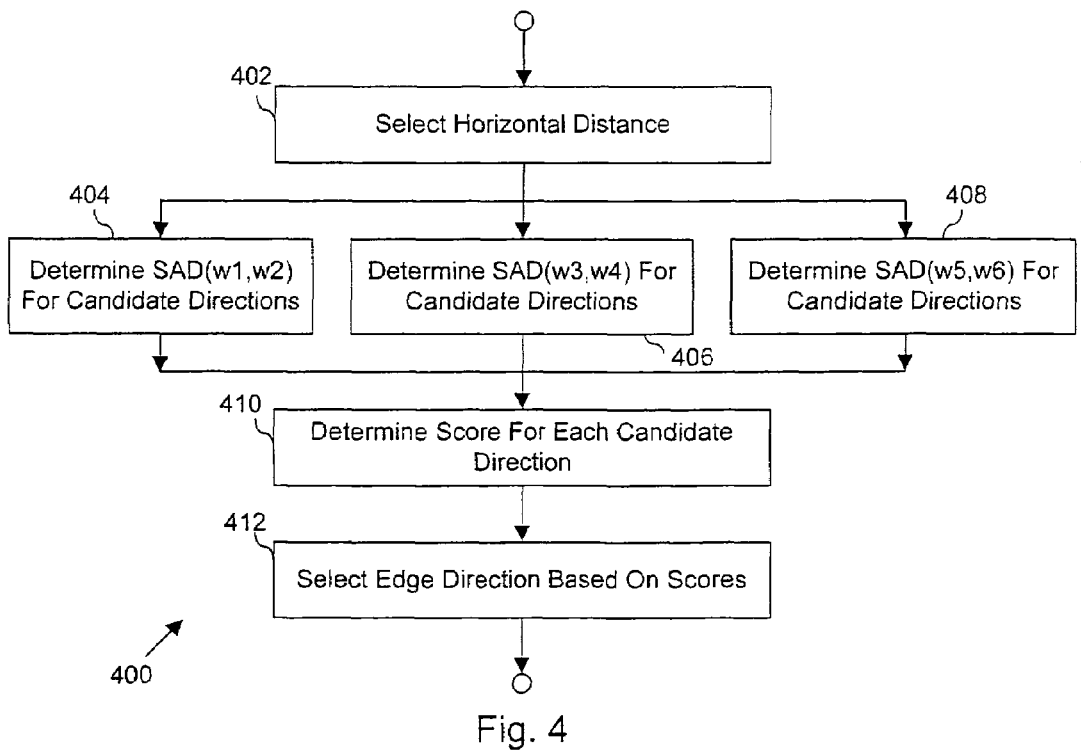
FIG. 4 is a flow chart illustrating respective portions of the process of FIG. 3 in greater detail.

Process 300 may continue in act 304 with detection of the edge direction. FIG. 4 is a flow chart illustrating a process 400 for determining artifact strength in accordance with an implementation of act 304. Process 400 may begin with selection of the horizontal distance [act 402] over which to undertake detecting edge directions. For example, as discussed above with respect to FIG. 2, in one implementation, a horizontal distance value of W=5 may be selected. When 5 is selected as the horizontal distance a total of 2W+1=11 candidate edge directions may be evaluated where those directions are delineated by the pixel pairs (−5, 5), (−4, 4), (−3,3), (−2, 2), (−1, 1), (0, 0), (1, −1), (2,−2), (3, −3), (4, −4) and (5,−5) defined with reference to the pixel 202 to be interpolated as shown in FIG. 2.

In one implementation, the horizontal distance value W may be selected by processor 102 in response to control data provided by host processor 112 although the invention is not limited in this regard and act 402 may, for example, be undertaken by processor 102 in response to other devices coupled to system 100 via interfaces 114 and/or 116. Alternatively, act 402 may, for example, be undertaken by processor 102 in response to control data and/or indicators associated with the portion of input video data obtained in act 302.

Figure 5A:
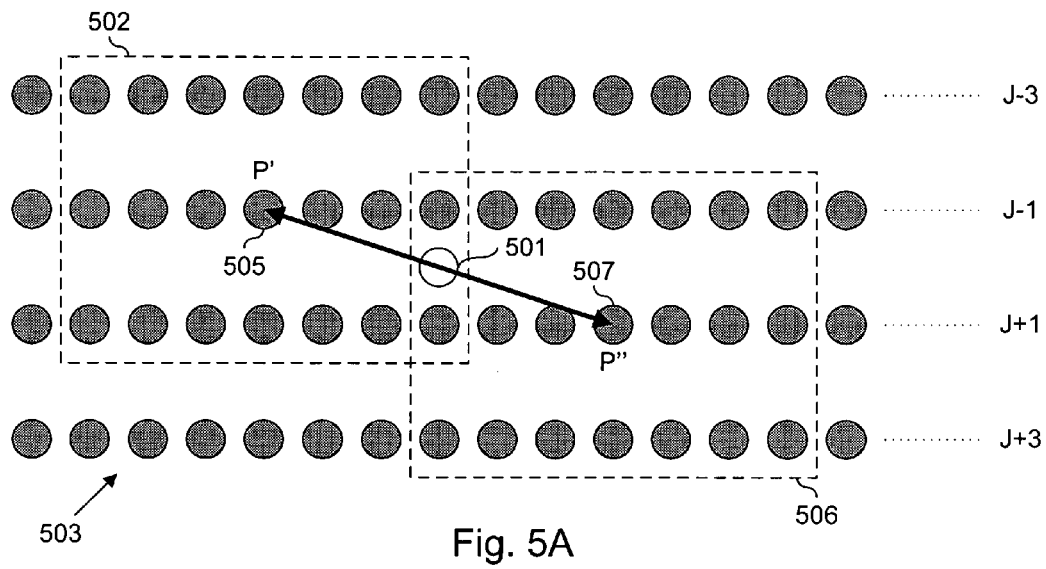
FIGS. 5A-C illustrate representative video data quantities.
Figure 5B:
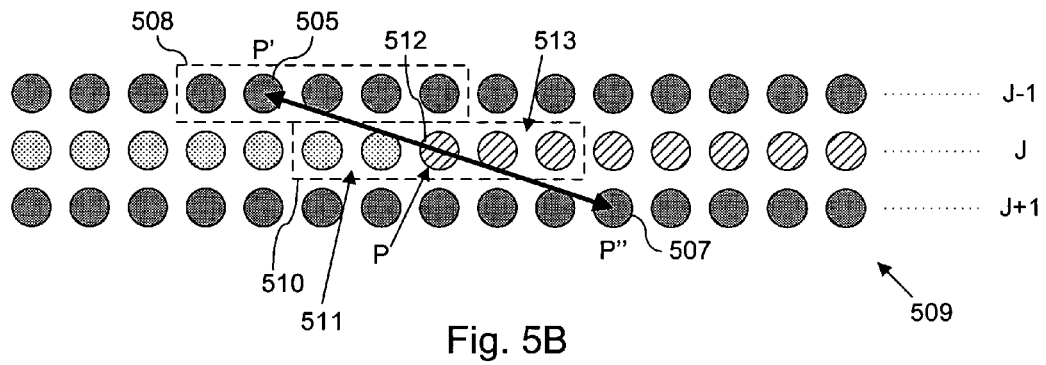
Figure 5C:
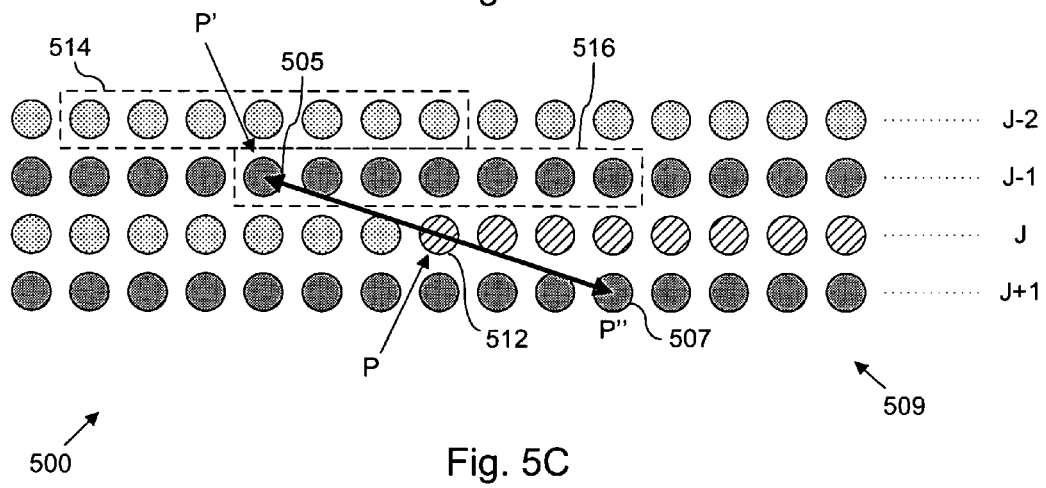

Process 400 may continue with the determination of the variation of pixel values for specific data windows [acts 404-408]. FIGS. 5A-C illustrate a representative labeling scheme 500 that may be used to describe implementations of edge directed de-interlacing with respect to acts 404-408 in accordance with implementations of the invention. When de-interlacing interlaced input video data in accordance with an implementation of the invention, scores for the 2W+1 candidate directions may be generated by determining a score value S for each candidate direction according to the following relationship of sum of absolute difference (SAD) values:

$$S=SAD(w1, w2)+SAD(w3, w4)+2[SAD(w5, w6)] \quad (1)$$

In the implementation of FIGS. 5A-C an example candidate edge direction is shown delineated by the pixel pair (−3,3). FIG. 5A illustrates a representative labeling scheme for an implementation of determining SAD(w1,w2) [act 404] for the example (−3,3) candidate direction for a pixel 501 to be interpolated in the current line J of pixels being processed for interpolation. Referring to this figure, the quantity w1 of equation (1) represents a 7×3 data window 502 in a current field 503 of the input interlaced video data (represented, in part, in FIG. 5A by portions of video lines J−3, J−1, J+1, and J+3) centered on a terminal edge pixel 505 (P') of the candidate edge direction being assessed (where, in this case, P' is a pixel in line J−1). Likewise, the quantity w2 represents a 7×3 data window 506 in the current field 503 centered on the other terminal edge pixel 507 (P") of the (3,−3) candidate edge direction.

In one implementation of the invention, act 404 may be performed by processor 102 of FIG. 1. In such case, processor 102 may ascertain the contents (pixel values) of windows 502 and 506, and undertake determination of the quantity SAD (w1,w2). For example, processor 102 may undertake determination of the quantity SAD(w1,w2)

$$SAD(w1,w2)=[ABS[p1(w1)-p1(w2)]+ \ldots + ABS[p21(w1)-p21(w2)]] \quad (2)$$

where p1(w1) refers to the pixel in the upper left-hand corner of window 502, p1(w2) refers to the pixel in the upper left-hand corner of window 506, p21(w1) refers to the pixel in the lower right-hand corner of window 502, p21(w2) refers to the pixel in the lower right-hand corner of window 506, and ABS refers to the absolute value of the bracketed quantities.

FIG. 5B illustrates a representative labeling scheme for an implementation of determining SAD(w3,w4) [act 406] for the example (3,−3) candidate direction. Referring to this figure, the quantity w3 of equation 1 represents a 5×1 data window 508 associated with pixel P' in the current frame 509 of partially de-interlaced video data. The quantity w4 represents a 5×1 data window 510 centered on pixel P, the pixel currently being processed.

It should be noted that the portion of the current frame 509 shown in FIG. 5B includes portions of input video data lines J−1 and J+1 (as also shown in FIG. 5A) in addition to portions of a line J of video data that includes previously interpolated pixels 511 to the left in FIG. 5B of the current pixel being processed 512 (P) in line J and included in data window 510. In the implementation of FIG. 5B the value of pixel 512 may be represented by a line average of the vertically adjacent pixels in lines J−1 and J+1. Likewise, the value of each of the pixels 513 in line J to the right of pixel 512 in FIG. 5B included in data window 510 may also be represented by a line average of the respective vertically adjacent pixels in lines J−1 and J+1.

In one implementation of the invention, act 406 may be performed by processor 102 of FIG. 1. In such case, processor 102 may ascertain the contents (pixel values) of window 508 and, after determining the line averages for pixel P (512) and pixels 513, ascertain the contents of window 510, and undertake determination of the quantity SAD(w3,w4).

FIG. 5C illustrates a representative labeling scheme for an implementation of determining SAD(w5,w6) [act 408] for the example (3,−3) candidate direction. Referring to this figure, the quantity w5 of equation 1 represents a 7×1 data window 514 in line J−2 centered above pixel P' (line J−1) in the current frame 509 of partially de-interlaced video data. In the implementation of FIG. 5C, window 514 includes previously interpolated pixel values in line J−2. In addition, the quantity w6 represents a 7×1 data window 516, comprising pixels in line J−1 including the pixel P' (pixel 505), centered above the pixel to be interpolated (pixel P 512).

In one implementation of the invention, act 408 may be performed by processor 102 of FIG. 1. In such case, processor 102 may ascertain the contents (pixel values) of windows 514 and 516 and undertake determination of the quantity SAD (w5,w6).

It should be noted that while FIGS. 5A-C illustrate respective data windows w1-w6 for the example of the (−3,3) candidate direction and/or de-interlacing orientation, similar data windows may be defined with respect to the pixel pairs delineating all other candidate directions. Such data windows for candidate directions other than (−3,3) may bear the same spatial orientation with respect to those other direction's pixel pairs as the spatial orientations shown for windows 502, 506, 508, 510, 514, and 516 with respect to the (P',P''') pixel pair in FIGS. 5A-C. Moreover, as those skilled in the art will recognize, de-interlacing video in a top-down and right-to-left manner or orientation is conventional and FIGS. 5A-C assume this convention. However, the invention is not limited in this regard and other orientations may be implemented. For example, acts 404-408 may also be undertaken in a right-to-left processing orientation (describable with attendant modification to the labeling scheme of FIGS. 5A-C) without departing from the scope and spirit of the invention.

Furthermore, with respect to equation 1, the weight value of 2 applied to the quantity SAD(w5, w6) represents only one possible choice of weight value and other weight values are possible in accordance with other implementations of the invention. In addition, the locations and sizes of data windows w1-w6 in the scheme 300 as shown and describe herein are representative of only one implementation of invention and other data window locations and sizes are possible in accordance with the scope and spirit of the invention.

Returning again the FIG. 4, process 400 may continue with a determination of a score for each candidate direction [act 410]. In one implementation, this may be done by determining S (equation 1) for each candidate edge direction processed through acts 404-408. For example, processor 102 of FIG. 1 may be employed to determine the score S for each candidate edge direction.

Upon determination of candidate edge direction scores in act 410, process 400 may conclude with selection of an edge direction based on those scores [act 412]. In one implementation, the candidate edge direction having the lowest score S may be selected as the edge direction in act 412. One way to do this is to have processor 102 of FIG. 1 select the edge direction having the lowest score in act 412 after having determined all the candidate scores in act 410.

Referring again to FIG. 3, once act 304 of detecting the edge direction has been performed as discussed above with respect to the implementations shown in FIG. 4 and FIGS. 5A-C, process 300 may continue with performance of edge directed interpolation [act 306] in accordance with the invention. One way to do this is to have processor 102 of FIG. 1 determine the value for the pixel being interpolated (for example, pixel 512 of FIGS. 5B-C) by averaging the two pixel values of the pair of pixels that delineates the edge direction detected in act 304. For instance, referring again to the example illustrated in FIGS. 5A-C, were direction (−3,3) determined to be the edge direction in act 304 having the lowest score S (as described above with respect to acts 404-412 of process 400) then processor 102 may average the values of the pixels P' 505 and P''' 507 to obtain the edge directed interpolated value for pixel 512.

Figure 6:
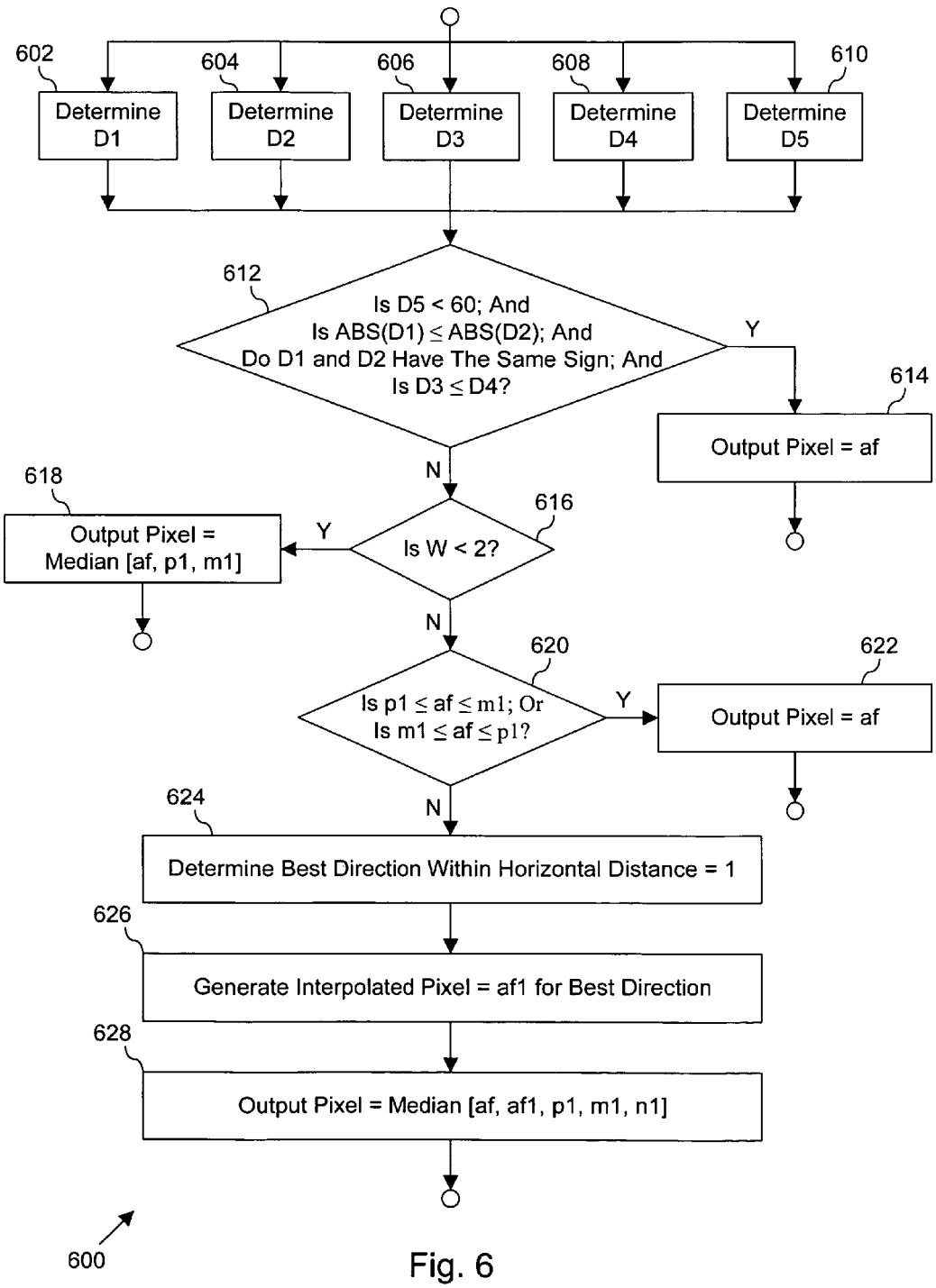
FIG. 6 is a flow chart illustrating respective portions of the process of FIG. 3 in greater detail.
Figure 7:
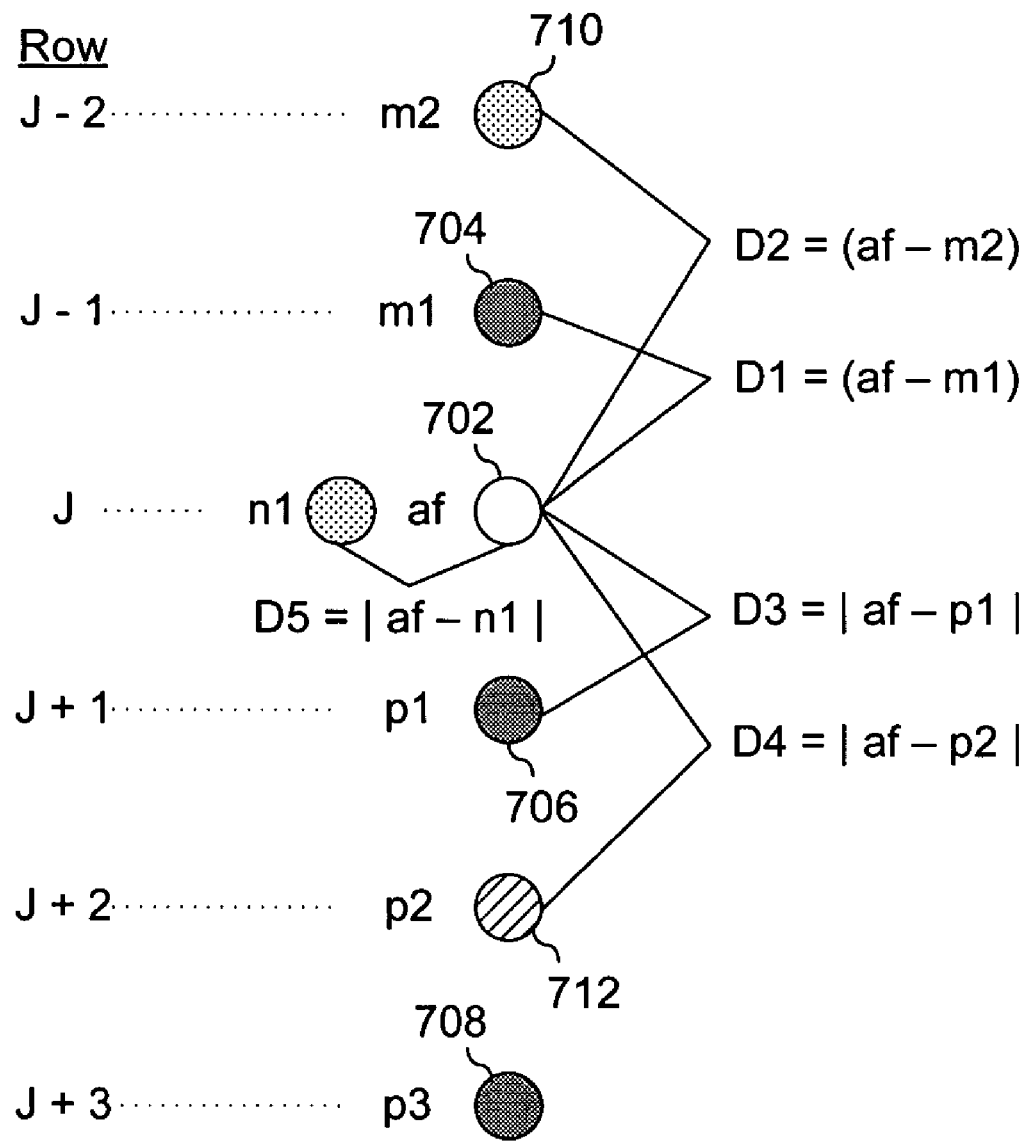
FIG. 7 illustrates another representative video pixel labeling scheme.

Having performed edge directed interpolation in act 306, process 300 may, in accordance with the invention, continue with error protection [act 308] of the interpolated pixel. FIG. 6 is a flow chart illustrating a process 600 for performing error protection in accordance with one implementation of act 308, while FIG. 7 illustrates a representative labeling scheme 700 that may be used to describe implementations of error protection with respect to process 600 in accordance with implementations of the invention. Any and/or all of the acts of process 600 may be performed by processor 102 of FIG. 1. However, the invention is not limited in this regard and other components of system 100, such as host processor 112 may perform one or more of the acts of process 600.

Referring to FIG. 7, scheme 700 defines several quantities (D1, D2, D3, D4 and D5) with respect to a directionally interpolated pixel 702 (in line J), where pixel 702 may represent the pixel value most recently obtained through the edge directed interpolation performed in act 306. The value of pixel 702 obtained through the edge directed interpolation is represented in scheme 700 as the quantity (af). Pixels 704, 706, and 708 (having the respective values m1, p1, and p3) represent pixels in the current field of input video data (e.g., field 503 of FIG. 5A) located in lines J−1, J+1, and J+3 respectively and found in the same data column I as the directionally interpolated pixel 702. Pixel 710 (having value m2) represents a previously directionally interpolated pixel of line J−2 also occupying the same column I as pixel 702. Pixel 712 (having value m2) represents a temporary pixel value of row J+2 also occupying the same column I as pixel 702 and obtained by averaging the values of pixels 706 (p1) and 708 (p3). Finally, pixel 714 (having value n1) represents the value of the previously directionally interpolated pixel in line J.

Along with the values for pixels 702-714 (af, m1, p1, p3, m2, p2, and n1 respectively), scheme 700 also defines the following quantities:

$$D1=[af-m1] \quad (3)$$

$$D2=[af-m2] \quad (4)$$

$$D3=ABS[af-p1] \quad (5)$$

$$D4=ABS[af-p2] \quad (6)$$

$$D5=ABS[af-n1] \quad (7)$$

where ABS is the absolute value of the bracketed quantities.

Referring to both FIGS. 6 and 7, process 600 may begin with the determination of values for the quantities D1 [act 602], D2 [act 604], D3 [act 606], D4 [act 608], and D5 [act 610]. One way to implement acts 602-610 is to have processor 102 of FIG. 2 undertake the respective determinations in keeping with the relationships set out in equations (3)-(7) above.

Process 600 may continue with an assessment in act 612 of the quantities D1, D2, D3, D4, and D5 determined or generated in acts 602-610. Specifically, in the implementation of the invention set forth in process 600, act 612 may constitute determining whether the value of D5 is less than 60, whether the absolute value of D1 is less than or equal to the absolute value of D2, whether D1 and D2 have the same sign, and whether the value of D3 is less than or equal to the value of D4. If the answer to all four queries is yes then process 600 may conclude in act 614 with the selection of the value af as the output pixel value (i.e., with the selection of the value of the directionally interpolated pixel 702 as the interpolated output pixel value). In other words, if the result of act 612 is a positive determination then no error correction may be applied and the output pixel value may be the directionally interpolated pixel value af obtained in act 306 of FIG. 3.

If, however, the result of act 612 is negative (i.e., if any one of the conditions described above with respect to act 612 is not met) then process 600 may continue with a determination of whether the horizontal distance factor W is less than two [act 616]. If the result of act 616 is positive then process 600 may conclude in act 618 with the selection of the value of the output pixel as the median of the values (af, p1, m1). In other words, if the value of W is less than two then the output pixel value may not be the directionally interpolated value as determined in 306 but, rather, may be the error corrected value corresponding to the median of the values (af, p1, m1).

If, however, the result of act 616 is negative (i.e., if the value of W is equal to or greater than two) then process 600 may continue in act 620 with a determination of whether (p1≦af≦m1) or whether (m1≦af≦p1). If either condition in act 620 is met then af may be selected as the output pixel value [act 622] and process 600 may complete. In other words, if the result of act 620 is a positive determination then no error correction may be applied and the output pixel value may be the directionally interpolated pixel value af obtained in act 306 of FIG. 3.

Alternatively, if the result of act 620 is negative (i.e., if both conditions in act 620 fail) then process 600 may continue in act 624 with a determination of the best direction within horizontal distance W=1. In other words, the minimum score from the scores for directions (−1,1), (0,0), and (1,−1) as determined in 410 of FIG. 4 may be determined in act 624. Subsequently, the average of the pixel pair delineating that direction having the minimal score determined in act 624 may be used to generate an interpolated value af1 [act 626]. Process 600 may then conclude with the determination in act 628 of the output pixel value as the median of the values (af, af1, p1, m1, n1). In other words, if the result of act 620 is negative then the output pixel value may not be the directionally interpolated value as determined in 306 but, rather, may be the error corrected value corresponding to the median of the values (af, af1, p1, m1, n1).

The acts shown in FIGS. 3, 4 and 6 need not be implemented in the order shown; nor do all of the acts necessarily need to be performed. For example, selection of the horizontal distance in act 402 may be undertaken at any juncture prior to acts 404-408. Also, those acts that are not dependent on other acts may be performed in parallel with the other acts. For example, acts 404-408 of process 400 may be undertaken in parallel. Likewise, acts 602-610 of process 600 may be undertaken in parallel. Moreover, some acts of processes 300, 400 or 600 may be implemented in and/or undertaken using hardware and/or firmware and/or software. For example, the acts in process 600 of determining D1-D5 (acts 602-610) may be implemented using hardware and/or firmware, while other acts may be implemented in software (e.g., decisions 612, 616 and/or 620). However, the invention is not limited in this regard and acts that may be implemented in hardware and/or firmware may, alternatively, be implemented in software. For example, acts 602-610 may be implemented in software. Clearly, many such combinations of software and/or hardware and/or firmware implementation of processes 300, 400 and/or 600 may be contemplated consistent with the scope and spirit of the invention. Further, at least some of the acts in processes 300, 400 and/or 600 may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. Clearly, many implementations may be employed to provide a method, apparatus and/or system to implement edge directed de-interlacing consistent with the claimed invention.

No element, act, or instruction used in the description of the present application should be construed as critical or essential to the invention unless explicitly described as such. Also, as used herein, the article "a" is intended to include one or more items. In addition, some terms used to describe implementations of the invention, such as "data" and "value," may be used interchangeably in some circumstances. For example, those skilled in the art will recognize that the terms "pixel value" and "pixel data" may be used interchangeably without departing from the scope and spirit of the invention. Moreover, when terms such as "coupled" or "responsive" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   identifying an interpolation direction by determining a score for a plurality of candidate interpolation directions, wherein determining the score for the candidate interpolation directions includes, for each candidate interpolation direction, determining a first sum of absolute differences for a first data window centered on a first terminal edge pixel of the candidate edge direction in a current field of interlaced data and a second data window centered on a second terminal edge pixel of the candidate edge direction plus a sum of absolute differences of a third data window associated with said first terminal edge pixel in a current frame of partially de-interlaced video and a fourth data window centered on the currently processed pixel plus a sum of absolute differences of a fifth data window centered on a pixel in a line above the line including said first terminal edge pixel in a current frame of partially de-interlaced video and a sixth data window including the first terminal pixel, said sixth data window centered above the pixel to be interpolated;

interpolating along the interpolation direction to obtain an interpolated pixel value; and electronically transforming said interpolated pixel value for display.

2. The method of claim 1, wherein the second data window further includes previously interpolated pixel values in a same row as that of the interpolated pixel value.

3. The method of claim 1, wherein identifying an interpolation direction further includes:

comparing pixel values associated with the third data window, the third data window including the first terminal pixel of the candidate direction, to, at least in part, pixel values associated with the fourth data window, the fourth data window including previously interpolated pixel values in a pixel row adjacent to the first terminal pixel of the candidate direction.

4. The method of claim 1, further including error protecting the interpolated pixel value based, at least in part, on differences between pixel values in a column of pixel values including the interpolated pixel value.

5. The method of claim 4, further comprising:

error protecting the interpolated pixel value based, at least in part, on a difference in pixel values between a previously interpolated pixel value in the same row as the interpolated pixel value and the interpolated pixel value.

6. A device, comprising:

video processing logic at least capable of de-interlacing input video data by selecting a direction over which to intern pixel values of the input video data to determine an edge directed interpolated pixel value;

wherein the video processing logic selects the direction by determining a first sum of absolute differences for a first data window centered on a first terminal edge pixel of a candidate edge direction in a current field of interlaced data and a second data window centered on a second terminal edge pixel of the candidate edge direction plus a sum of absolute differences of a third data window associated with said first terminal edge pixel in a current frame of partially de-interlaced video and a fourth data window centered on the currently processed pixel plus a sum of absolute differences of a fifth data window centered on a pixel in a line above the line including said first terminal edge pixel in a current frame of partially de-interlaced video and a sixth data window including the first terminal pixel, said sixth data window centered above the pixel to be interpolated.

7. The device of claim 6, further comprising:

wherein the video processing logic is at least capable of interpolating over the selected direction to obtain an interpolated pixel value; and wherein the video processing logic is at least capable of error protecting the edge directed interpolated pixel value by comparing differences between the edge directed interpolated pixel value and other pixel values in a column of pixel values including the interpolated pixel value.

8. The device of claim 7, wherein the column of pixel values includes, at least in part, a previously interpolated edge directed pixel value and a pixel value interpolated by line averaging.

9. The device of claim 7, wherein the video processing logic is at least capable of error protecting the edge directed interpolated pixel value by comparing differences between the edge directed interpolated pixel value and a previously interpolated edge directed pixel value of the same row of pixels as the edge directed interpolated pixel value.

10. A system, comprising:

video processing logic at least capable of de-interlacing input video data to create output video data by determining a first sum of absolute differences for a first data window centered on a first terminal edge pixel of a candidate edge direction in a current field of interlaced data and a second data window centered on a second terminal edge pixel of the candidate edge direction plus a sum of absolute differences of a third data window associated with said first terminal edge pixel in a current frame of partially de-interlaced video and a fourth data window centered on the currently processed pixel plus a sum of absolute differences of a fifth data window centered on a pixel in a line above the line including said first terminal edge pixel in a current frame of partially de-interlaced video and a sixth data window including the first terminal pixel, said sixth data window centered above the pixel to be interpolated; and an image output device responsive to the output video data.

11. The system of claim 10, further comprising:

wherein the video processing logic is at least capable of interpolating over an interpolation direction to obtain an interpolated pixel value; and wherein the video processing logic is at least capable of error protecting the interpolating pixel value by comparing differences between the interpolated pixel value and other pixel values in a column of pixel values including the interpolated pixel value, a pixel value interpolated by line averaging and a pixel value previously interpolated from the input video data using edge directed interpolation.

12. The system of claim 11, wherein the video processing logic is at least capable of error protecting the interpolating pixel value by comparing differences between the interpolated pixel value and a previously interpolated pixel value of the same row of pixels as the interpolated pixel value.

13. An article comprising a machine-accessible medium having stored thereon instructions that, when executed by a machine, cause the machine to:

identify a direction over which to interpolate a pixel value by obtaining a score for a plurality of candidate interpolation directions, wherein for each candidate interpolation direction, determining a first sum of absolute differences for a first data window centered on a first terminal edge pixel of the candidate edge direction in a current field of interlaced data and a second data window centered on a second terminal edge pixel of the candidate edge direction plus a sum of absolute differences of a third data window associated with said first terminal edge pixel in a current frame of partially de-interlaced video and a fourth data window centered on the currently processed pixel plus a sum of absolute differences of a fifth data window centered on a pixel in a line above the line including said first terminal edge pixel in a current frame of partially de-interlaced video and a sixth data window including the first terminal pixel, said sixth data window centered above the pixel to be interpolated;

interpolate along the identified direction to obtain an interpolated pixel value; and electronically transform said interpolated pixel value for display.

14. The article of claim 13, wherein the instructions to identify the direction, when executed by a machine, cause the machine to:

compare pixel values associated with the third data window, the third data window including the first terminal pixel of the candidate direction, with, at least in part, pixel values associated with the fourth data window, the fourth data window including previously interpolated pixel values in a pixel row adjacent to the first terminal pixel of the candidate direction.

15. The article of claim 13 further having stored thereon instructions that, when executed by a machine, cause the machine to:

error protect the interpolated pixel value by, at least in part, comparing differences in pixel values for a column of pixel values including the interpolated pixel value.

* * * * *

UNITED STATES PATENT AND TRADEMARK OFFICE
CERTIFICATE OF CORRECTION

| | | |
|---|---|---|
| PATENT NO. | : 7,554,559 B2 | Page 1 of 1 |
| APPLICATION NO. | : 11/270429 | |
| DATED | : June 30, 2009 | |
| INVENTOR(S) | : Tiehan Lu et al. | |

It is certified that error appears in the above-identified patent and that said Letters Patent is hereby corrected as shown below:

Col. 9:
Line 46, "intern" should be --interpolate--.

Signed and Sealed this
Twenty-third Day of October, 2012

David J. Kappos
*Director of the United States Patent and Trademark Office*